United States Patent [19]

Takada

[11] Patent Number: 4,518,204
[45] Date of Patent: May 21, 1985

[54] WHEEL FOR A VEHICLE

[75] Inventor: Minoru Takada, Hoya, Japan

[73] Assignee: Honda Giken Kogyo Kabushiki Kaisha, Tokyo, Japan

[21] Appl. No.: 492,599

[22] Filed: May 9, 1983

[30] Foreign Application Priority Data

May 10, 1982 [JP] Japan .................. 57-76529

[51] Int. Cl.³ .................. B60B 23/00; B21D 53/26
[52] U.S. Cl. .................. 301/63 R; 29/159 R; 301/64 R; 301/65
[58] Field of Search .................. 301/6 V, 67, 66, 65, 301/64 R, 63 R, 64 SD, 73, 74, 62, 95, 5 VH; 137/231, 223; 29/159 R, 159.03; 156/295; 403/265, 266

[56] References Cited

U.S. PATENT DOCUMENTS

| | | | |
|---|---|---|---|
| 1,693,084 | 5/1920 | Kraft | 301/5 VH |
| 3,545,795 | 12/1970 | Hertel | 403/265 |
| 3,627,264 | 12/1971 | Scherer | 137/223 |
| 3,910,638 | 7/1975 | Scott | 301/63 R |
| 4,171,119 | 10/1979 | Lamson | 137/223 |
| 4,256,346 | 3/1981 | Kawaguchi | 301/66 |
| 4,256,348 | 3/1981 | Lester | 301/65 |
| 4,286,825 | 9/1981 | Sieving | 301/63 R |

Primary Examiner—David A. Scherbel
Assistant Examiner—Dennis Rodgers
Attorney, Agent, or Firm—Armstrong, Nikaido, Marmelstein & Kubovcik

[57] ABSTRACT

Disclosed is an improved wheel for a vehicle of the type having an annular rim adapted to carry a tire thereon and a wheel center, the annular rim being press fitted onto the outer peripheral part of said wheel center, the improvement consisting in that the annular rim and the wheel center are connected to one another with the aid of a layer of adhesive agent which is distributed in such a manner that its thickness assumes the maximum value at the central part of the cross-sectional configuration and decreases toward both the side edge parts of the wheel in the transverse direction. The maximum thickness of the layer of adhesive agent is determined in the range of 0.05 to 0.5 mm. The annular rim is firmly connected to the outer peripheral part of the wheel center by means of the layer of adhesive agent without any necessity for welding or the like operation so that the wheel has a good appearance. Epoxy resin based adhesive agent is preferably used for the wheel.

10 Claims, 7 Drawing Figures

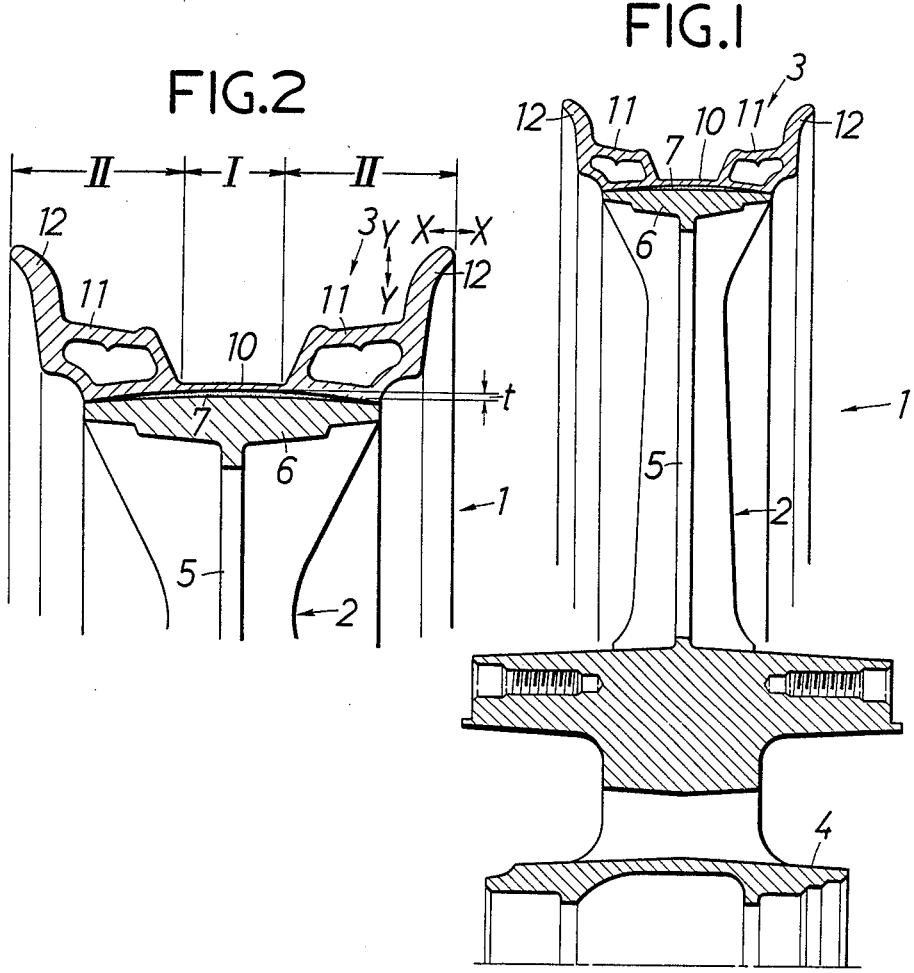
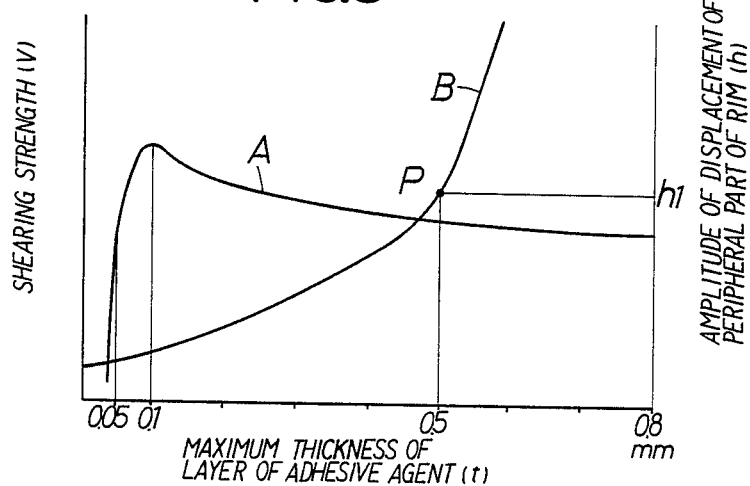

WHEEL FOR A VEHICLE

BACKGROUND OF THE INVENTION

The present invention relates to a wheel for a vehicle such as motorcycle, motortricycle or the like and more particularly to an improved wheel of the type including an annular rim adapted to carry a tire thereon and a wheel center, said annular rim being firmly fitted onto the outer peripheral part of said wheel center.

Hitherto, wire spoke wheel, disc wheel made of steel plate, disc wheel made of light metal alloy or the like is known as a wheel of the above-mentioned type. For instance, some wheels made of light metal alloy are manufactured by casting both the annular rim and the wheel center in an integral structure, but many of them are generally manufactured by way of the steps of preparing annular rim and wheel center separately in the form of two pieces or annular rim, spokes and hub separately in the form of three pieces and then assembling them to an integral structure by welding, rivetting or the like operation. In some case the annular rim and the wheel center are connected to one another by press fitting the annular rim onto the outer peripheral part of the wheel center and then welding them together, but the wheel manufactured in that way has a degraded appearance due to roughness on the outer surface caused by welding. For this reason, welding should be preferably avoided for the purpose of assembling components to an integral structure for a wheel for use with a motorcycle or a vehicle.

SUMMARY OF THE INVENTION

The present invention has been made with the foregoing background in mind. Thus, it is an object of the present invention to provide an improved wheel for a vehicle which is capable of obviating the problems with the conventional wheels by fitting an annular rim onto the outer peripheral part of a wheel center with a layer of adhesive agent interposed therebetween without any necessity for a welding operation to connect them together firmly.

To accomplish the above object there is proposed in accordance with the present invention an improved wheel for a vehicle of the type having an annular rim adapted to carry a tire thereon and a wheel center, said annular rim being press fitted onto the outer peripheral part of said wheel center, the improvement consisting in that the annular rim and the wheel center are connected to one another with a layer of adhesive agent distributed therebetween in such a manner that the layer of adhesive agent has the maximum thickness in the range of 0.05 to 0.5 mm at the central part of the cross-sectional configuration thereof and its thickness decreases toward both the side edge parts of the wheel in the transversal direction.

Epoxy resin based adhesive agent is usually employed for the wheel.

To keep the layer of adhesive agent in the required cross-sectional configuration an arrangement is made such that the annular rim includes a central well portion and a pair of flange portions located at both the sides of said central well portions, said flange portions having a rigidity higher than that of the well portion.

In a preferred embodiment of the present invention the wheel center is constructed by a combination of a hub, a plurality of spokes extending from said hub in the radial direction and a spoke connecting ring made integral with said spokes, said spoke connecting ring being located outward of the hub in a coaxial relation. Further, a through hole is formed through both the annular rim and the spoke connecting ring so that a compressed air feeding valve is airtightly fitted into said through hole. To prevent any air leakage a sealing member made of elastomeric material is disposed between the through hole and the compressed air feeding valve.

In a modified embodiment of the present invention a first through hole is formed through the annular rim and a second through hole is formed through the spoke connecting ring, so that a compressed air feeding valve is fitted into the first through hole which is dimensioned in diameter smaller than the second through hole. In this embodiment a sealing member made of elastomeric material is disposed between the first through hole and the compressed air feeding valve.

Above and other objects, features and advantages of the invention will be more apparent from reading of the following description made in conjunction with the accompanying drawings.

BRIEF DESCRIPTION OF THE DRAWINGS

The accompanying drawings will be briefly described below.

FIG. 1 is a vertical section of an upper half of a wheel in accordance with an embodiment of the invention.

FIG. 2 is a partial sectional view of the wheel in FIG. 1 illustrating an essential part thereof, shown in an enlarged scale.

FIG. 3 is a diagram illustrating a correlation among the maximum thickness of layer of adhesive agent (t), shearing strength (V) and displacement of the peripheral part of a wheel.

DETAILED DESCRIPTION OF PREFERRED EMBODIMENTS

Figure 5:
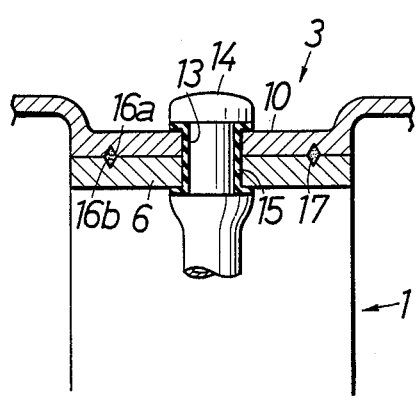
FIG. 5 is a partial sectional view of a wheel in accordance with a modified embodiment of the invention, shown in the similar manner to FIG. 4.

Now, the present invention will be described in greater details hereunder with reference to the accompanying drawings which illustrate a few preferred embodiments of the invention. It should be noted that same or similar members or parts illustrated for the respective embodiments throughout the drawings will be represented by same reference numerals.

First, description will be made as to the first embodiment of the invention with reference to FIGS. 1 to 4.

In FIG. 1 an upper half of a wheel 1 of the invention made of light metal alloy is shown by way of a vertical sectional view. The wheel 1 essentially comprises a wheel center 2 and an annular rim 3 fitted onto the outer peripheral part of the wheel center 2 to carry an inner peripheral bead portion (not shown) of a tire thereon.

Specifically, the wheel center 2 comprises a hub 4 fitted onto an axle (not shown), a plurality of spokes 5 extending from said hub 4 in the radial direction, and a spoke connecting ring 6 located outward of the hub 4 in a coaxial relation and made integral with said spokes 5 at the outermost ends thereof. In the illustrated embodiment, the hub 4, the spokes 5 and the spoke connecting ring 6 are formed integral with one another. Alternatively, they may be prepared separately and then may be assembled together with the aid of suitable connecting means. Obviously, the spoke connecting ring 6 constitutes an outer peripheral part of the wheel center 2.

The annular rim 3 is press fitted along the outer periphery of the spoke connecting ring 6 under application of a predetermined force with a layer of epoxy resin based adhesive agent 7 interposed therebetween whereby the spoke connecting ring 6 and the annular rim 3 are firmly connected to one another by means of the layer of epoxy resin based adhesive agent 7.

The annular rim 3 includes a well portion 10 disposed at the central part, the well portion 10 being dimensioned relatively thin and having a reduced rigidity, a pair of bead seats 11 located adjacent the well portion 10 and having a high rigidity and a pair of flange portions 12 located outside the bead seats 11. As will be best seen from FIG. 2, a lower rigidity zone I is constituted merely by the well portion 10, while a higher rigidity zone II is constituted by a combination of the bead seats 11 and the flange portions 12.

The inner diameter of the annular rim 3 is dimensioned appreciably smaller than the outer diameter of the spoke connecting ring 6 and therefore the annular rim 3 is fitted onto the outer periphery of the spoke connecting ring 6 with the layer of adhesive agent 7 interposed therebetween after the former is expanded by heating or the latter is contracted by cooling. As the annular rim 3 or the spoke connecting ring 6 is restored to the original state at a room temperature after completion of fitting, inner stress is generated in both the annular rim 3 and the spoke connecting ring 6 in the radial direction, i.e., in the direction extending at a right angle relative to their peripheral surface. Specifically, tensile stress is generated in the annular rim 3 in the peripheral direction, resulting in difference in strain between the lower rigidity zone I and the higher rigidity zone II, whereas compressive stress is generated in the spoke connecting ring 6 having a symmetrical cross-sectional configuration, resulting in difference in strain between the central part and both the edge parts because of difference in rigidity between them. Thus, both the annular rim 3 and the spoke connecting ring 6 are caused to deform in such a manner that the layer of adhesive agent 7 is thickest at the central part and decreases in thickness toward the sides and thereby a crescent-shaped cross-sectional configuration is formed. Further, since both the side edge parts of the annular rim 3 and both the side edge parts of the spoke connecting ring 6 are caused to overlap one above the other due to their deformation in the same direction, it results that comparatively wide pressure contact surface is formed between the aforesaid side edge parts whereby sufficiently high fitting strength is assured by press fitting in that way.

It should be noted that the spoke connecting ring 6 should not be limited to the above-described configuration where there occurs difference in strain between the central part and both the side edge parts but it may be designed so as to assure rigidity enough to maintain the initial cross-sectional configuration even when it is subjected to compressive strain. Namely, an arrangement may be made such that a layer of adhesive agent having a crescent-shaped cross-sectional configuration is formed merely by deformation of the annular rim 3. Sufficiently high connecting or bonding strength will be assured with the aid of adhesive agent in the above-described manner.

It is known that connecting or bonding strength is usually dependent on the thickness of a layer of adhesive agent when two members or parts are connected or bonded to one another by utilizing an adhesive agent. In this connection the results of examination with respect to relation between the maximum thickness t of a layer of adhesive agent 7 and shearing strength V of a connected or bonded part are exemplified in FIG. 3, wherein epoxy resin based adhesive agent is employed for the wheel 1 of the illustrated embodiment. As will be apparent from the diagram, shearing strength V reaches the maximum at $t = 0.1$ mm and it decreases sharply in the range of $t < 0.05$ mm. For the reason it is preferable that connecting or bonding is effected in the range of $t \geq 0.05$ mm.

As the maximum thickness t of a layer of adhesive agent 7 increases gradually, there is a tendency that an amplitude of radial displacement of the outer peripheral part of the annular rim 3 relative to the center of a bearing for the wheel 1, i.e., displacement of the same in the direction Y—Y as seen in the drawing as well as axial displacement of the same, i.e., displacement in the direction X—X in parallel to the center axis of the bearing increase due to resiliency of the layer of adhesive agent 7. A relation of amplitude of displacement of the peripheral part of the annular rim 3 relative to the maximum thickness t of the layer of adhesive agent 7 is as illustrated by a curve B in FIG. 3. As is readily seen from the diagram, the curve B extends upward at a steeper inclination angle from a point P corresponding to $t = 0.5$ mm. Thus, it is possible to keep an amplitude of displacement h at a possibly lower level by carrying out assembling operation in the range of $t \leq 0.5$ mm. The amplitude of displacement h will be kept less than the maximum amplitude of displacement $h_1$ corresponding to the turning point P which is acceptable from the viewpoint of dimensional accuracy for wheel assembling.

Accordingly, it is preferable that the maximum thickness t of the layer of adhesive agent 7 is determined in the range of $0.05 \leq t \leq 0.5$ mm, taking into account shearing strength V and amplitude of displacement h.

Incidentally, the reason why epoxy resin based adhesive agent is employed for the wheel is attributable to the following properties of epoxy resin.
(1) high mechanical strength and toughness,
(2) excellent affinity to metallic material,
(3) small contraction after completion of curing,
(4) high material stability and long durability,
(5) high heat resistance with the aid of a suitable hardening agent mixed therewith.

It should be understood that the present invention should not be limited only to epoxy resin based adhesive agent but any suitable adhesive agent having properties substantially equivalent to those of epoxy resin may be used.

Further, it should be noted that thermosetting epoxy resin is employed as an adhesive agent when the wheel 1 is assembled by fitting with the annular rim heated up.

Since in the illustrated embodiment the annular rim 3 is fitted onto the spoke connecting ring 6 either with the annular rim 3 heated up or with the spoke connecting ring 6 cooled down, fitting operation of the annular rim 3 is easily carried out at a high operational efficiency.

Further, due to the arrangement that both the flange portions 12 have a rigidity higher than that of the well portion 10 on the annular rim 3, the well portion 10 is caused to deform a little bit outward in the radial direction when the annular rim 3 is fitted onto the spoke connecting ring 6 either with the former heated up or with the latter cooled down, whereby a hollow space having a crescent-shaped cross-sectional configuration is formed between the inner peripheral surface of the annular rim 3 and the outer peripheral surface of the spoke connecting ring 6. Thus, a layer of adhesive agent 7 will be built conveniently.

Further, since the annular rim 3 is firmly connected to the spoke connecting ring 6 with the aid of the layer of adhesive agent 7 interposed therebetween in addition to the above-mentioned fitting either with the annular rim heated up or with the spoke connecting ring cooled down, it is assured that the annular rim 3 is tightly fixed to the wheel center 2.

As described above, the central well portion 10 of the annular rim 3 is designed to have a rigidity lower than that of the bead seat portions 11 and the flange portions 12 in case of the illustrated embodiment and thereby the central well portion 10 is caused to deform in the peripheral direction at a higher deformation rate than that of the bead seat portions 11 and the flange portions 12, resulting in building of a hollow space having a crescent-shaped cross-sectional configuration between the inner peripheral surface of the annular rim 3 and the outer peripheral surface of the spoke connecting ring 6. Thus, adhesive agent will be filled in the aforesaid hollow space conveniently. Obviously, the cross-sectional configuration of the hollow space can be changed or modified as required by selectively determining the configuration of the annular rim 3 or the wheel center 2 at their peripheral part.

As will be apparent from the drawing, the bead seat portions 11 are designed in a hollow closed structure in order that both the side parts of the annular rim 3 have a rigidity higher than that of the central part of the same. Alternatively, the bead seat portions 11 and the flange portions 12 may be dimensioned in thickness larger than that of the well portion 10 or they may be formed with certain annular reinforcement members, respectively. Namely, a requirement for both the side parts of the annular rim 3 is that they have a higher rigidity than the central part so as to stand against stress active in the direction at a right angle relative to the joint surface between the annular rim 3 and the spoke connecting ring 6.

Figure 4:
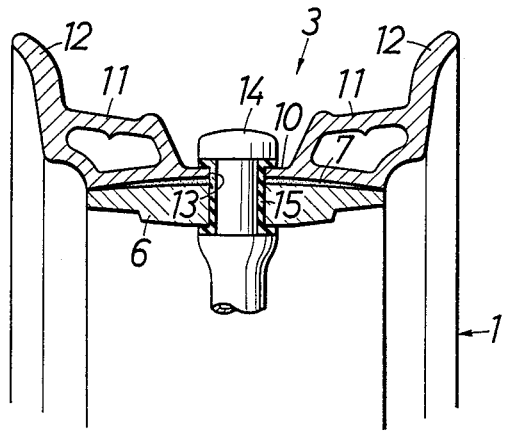
FIG. 4 is a partial sectional view of an essential part of the wheel, sectioned at a position different from that in FIG. 2 where a compressed air feeding valve is airtightly fitted through an annular wheel rim and a wheel center.

Next, FIG. 4 is a partial sectional view of the wheel 1 of the invention, taken at the position different from that in FIG. 1. A through hole 13 having almost the same diameter along the whole length is formed through the spoke connecting ring 6 of the wheel center 2 and the annular rim 3 at the illustrated position so that a compressed air feeding valve 14 is airtightly fitted into that through hole 13 with a sealing member 15 disposed therebetween. It should be noted that the compressed air feeding valve 14 and the sealing member 15 may be made integral with one another by using a suitable elastomeric material.

FIG. 5 illustrates a wheel in accordance with a modified embodiment of the invention by way of a partial sectional view similar to FIG. 4. In this modified embodiment a pair of oppositely located spiral grooves $16_a$ and $16_b$ are formed on the inner peripheral surface of the annular rim 3 and the outer peripheral surface of the spoke connecting ring 6 of the wheel center 2 and a feeding hole (not shown) extends through one of the annular ring 3 and the spoke connecting ring 6 until it comes in communication with said spiral grooves $16_a$ and $16_b$ whereby epoxy resin based adhesive agent 17 is supplied into the latter by way of that feeding hole. Thus, the annular rim 3 and the spoke connecting ring 6 are firmly connected or bonded to one another with the aid of the adhesive agent 7. A part of the adhesive agent 7 penetrates into the close clearance between the inner peripheral surface of the annular rim 3 and the outer peripheral surface of the spoke connecting ring 6 via the spiral grooves $16_a$ and $16_b$ so that they are connected to one another more tightly. Alternatively, adhesive agent 7 may be previously coated over the inner surface of the annular rim 3 or the outer surface of the spoke connecting ring 6 prior to fitting.

Construction and function of the modified embodiment are substantially same to the foregoing one with the exception of arrangement of the spiral grooves and therefore repeated description will not be required.

Figure 7:
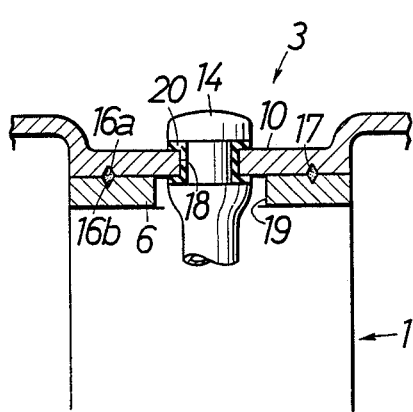
FIG. 7 is a partial sectional view of a wheel modified from the embodiment as illustrated in FIG. 5.
Figure 6:
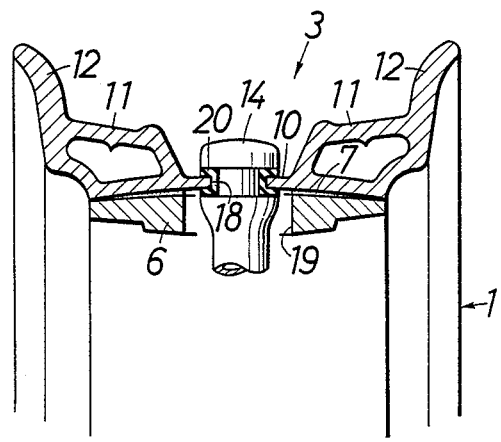
FIG. 6 is a partial sectional view of a wheel in accordance with another modified embodiment of the invention, shown in the similar manner to FIG. 4 with a compressed air feeding valve airtightly fitted through the annular wheel rim.

Next, FIG. 6 illustrates another modification from the embodiment in FIG. 4, whereas FIG. 7 does a modification from the embodiment in FIG. 5. In the wheel constructed in accordance with both the modified embodiments a first smaller hole 18 is formed through the annular rim 3 at its central part and a second larger hole 18 is formed through the spoke connecting ring 6 of the wheel center 2, the second larger hole 19 having an inner diameter larger than that of the first smaller hole 18 and being located in coaxial alignment with the latter. A compressed air feeding valve 14 is fitted through the first smaller hole 18 with a sealing member 20 disposed therebetween, the sealing member 20 serving to prevent an occurance of air leakage from the clearance between the compressed air feeding valve 14 and the first smaller hole 18. Construction and function of the modified embodiments are substantially same to those of the embodiments in FIGS. 4 and 5 with the exception of arrangement of the second larger hole and therefore repeated description will not be required.

As will be apparent from the above description, the present invention consists in that an annular rim is press fitted onto the outer peripheral part of a wheel center with a layer of adhesive agent disposed therebetween so that the annular rim and the wheel center are firmly connected or bonded to one another with the aid of the layer of adhesive agent which is distributed in the transversal direction relative to the wheel in such a manner that it has the maximum thickness in the range of 0.05 to 0.5 mm at the central part and its thickness decreases toward both the side edge parts. Thus, the annular rim and the wheel center are very tightly connected to one another by means of the layer of adhesive agent without any necessity for welding or the like operation. Accordingly, the wheel constructed in accordance with the invention has an excellent appearance.

When epoxy resin based adhesive agent is employed for the wheel, it is found that the annular rim and the wheel center are connected to one another in the optimum manner owing to advantageous properties of the epoxy resin based adhesive agent.

What is claimed is:

1. In am improved wheel for a vehicle including an annular rim adapted to carry a tire thereon and a wheel center, said annular rim being press-fitted onto an outer peripheral part of said wheel center, the improvement wherein said annular rim is formed symmetrical with respect to a vertical center line of the wheel and comprises a central well portion, a pair of bead seat portions located adjacent the well portion, a pair of flange portions located axially outside the bead seat portions, said bead seat portions and said flange portions having a rigidity higher than that of the central well portion, and an inner circumferential fitting surface having such an axial width that the surface extends over the well portion and at least a part of the respective bead seat portions, while said wheel center is formed symmetrical with respect to said vertical center line and comprises an outer circumferential fitting surface to be fitted with said inner circumferential fitting surface of the annular rim in an assembled state, whereby said inner circumferential fitting surface of the annular rim deforms, when it has been press-fitted onto the outer circumferential fitting surface of the wheel center with an adhesive agent interposed therebetween, to define between those fitting surfaces a space of a crescent-shaped cross-sectional configuration due to difference in strain between the central well portion and the bead seat portions and flange portions caused by difference in rigidity therebetween, said crescent-shaped space being filled with a layer of said adhesive agent having a maximum thickness of 0.05 to 0.5 mm at an axial center thereof and decreasing toward both axial side ends thereof for secure connection between the annular rim and the wheel center.

2. A wheel for a vehicle as defined in claim 1, wherein epoxy resin based adhesive agent is used for the layer of adhesive agent.

3. A wheel for a vehicle as defined in claim 1, wherein said outer peripheral part of the wheel center is constructed such that an axial center portion thereof has a rigidity higher than that of both axial side ends thereof and is adapted to deform when the annular rim is press-fitted onto the outer peripheral part of the wheel center.

4. A wheel for a vehicle as claimed in claims 1 or 3, wherein said inner circumferential fitting surface of the annular rim and said outer circumferential fitting surface of the wheel center are flat before assembly.

5. A wheel for a vehicle as claimed in claims 1 or 3, wherein said outer circumferential fitting surface of the wheel center has an axial width substantially equal to that of the inner circumferential surface of the annular rim.

6. A wheel for a vehicle as claimed in claim 1, wherein wide pressure contact areas are provided between the fitting surfaces around their axial side ends.

7. A wheel for a vehicle as defined in claim 1, wherein the wheel center comprises a hub, a plurality of spokes extending from said hub in the radial direction and a spoke connecting ring located outward of the hub in a coaxial relation and made integral with said spokes, and a through hole is formed through both the spoke connecting ring and the annular rim so that a compressed air feeding valve is airtightly fitted into said through hole.

8. A wheel for a vehicle as defined in claim 7, wherein a sealing member made of elastomeric material is disposed between the through hole and the compressed air feeding valve.

9. A wheel for a vehicle as defined in claim 7, wherein a first through hole is formed through the annular rim and a second through hole is formed through the spoke connecting ring, said first through hole being dimensioned in diameter smaller than said second through hole, so that a compressed air feeding valve is airtightly fitted into the first through hole.

10. A wheel for a vehicle as defined in claim 9, wherein a sealing member made of elastomeric material is disposed between the first through hole and the compressed air feeding valve.

* * * * *